United States Patent [19]
Abe et al.

[11] Patent Number: 5,315,897
[45] Date of Patent: May 31, 1994

[54] ENGINE SPEED CONTROL SYSTEM WITH CHANGING SHIFT-UP SPEED

[75] Inventors: Mitsutoshi Abe; Seiji Yashiki, both of Hiroshima, Japan

[73] Assignee: Mazda Motor Corporation, Hiroshima, Japan

[21] Appl. No.: 894,854

[22] Filed: Jun. 5, 1992

[30] Foreign Application Priority Data

Jun. 12, 1991 [JP] Japan .................................. 3-140411

[51] Int. Cl.$^5$ .............................................. F02D 29/02
[52] U.S. Cl. ..................................... 477/98; 123/333; 477/115; 477/138
[58] Field of Search ................. 74/857, 860, 861, 865, 74/866, 878, 856, 855; 123/319, 332, 333, 403; 364/424.1

[56] References Cited

U.S. PATENT DOCUMENTS

| | | | |
|---|---|---|---|
| 4,102,316 | 7/1978 | Valbert | 123/332 X |
| 4,411,174 | 10/1983 | Yokoi et al. | 74/865 X |
| 4,474,155 | 10/1984 | Sagues | 123/333 X |
| 4,638,781 | 1/1987 | Shiki et al. | 123/333 X |
| 4,998,519 | 3/1991 | Kobayashi | 123/333 |
| 5,076,116 | 12/1991 | Sasaki | 74/866 |
| 5,113,826 | 5/1992 | Anzai | 123/403 |
| 5,233,889 | 8/1993 | Iizuka | 74/856 X |

FOREIGN PATENT DOCUMENTS

3-124924 5/1991 Japan .................................. 123/332

Primary Examiner—Leslie A. Braun
Assistant Examiner—Khoi Ta
Attorney, Agent, or Firm—Keck, Mahin & Cate

[57] ABSTRACT

An engine speed control system causes an engine, equipped with an automatic transmission which shifts up according to predetermined shift schedules, to reduce its output at a predetermined engine speed so as to protect the engine by preventing the engine from being subjected to "over-revolution." The predetermined engine speed is changed according to engine operating conditions such as a decrease in engine temperature. Simultaneously, a shift-up vehicle speed, at which the automatic transmission shifts itself up, is decreased according to engine operating conditions and, more particularly, engine temperatures and throttle openings. As a result, an up-shift of the automatic transmission properly takes place, even when the vehicle travels at lower speeds.

16 Claims, 6 Drawing Sheets

ENGINE SPEED CONTROL SYSTEM WITH CHANGING SHIFT-UP SPEED

BACKGROUND OF THE INVENTION

1. Field of the Invention

This invention relates to an improved engine control system for an automotive engine and, in particular, an automotive engine equipped with an automatic transmission. The engine control system of this invention is designed to interrupt fuel supply to the engine while the engine operates under normal engine load conditions in which a throttle valve opens so as to prevent the speed of the engine from being raised beyond an "over-revolution" restrictive speed.

2. Description of Related Art

In order to prevent an automotive engine from operating in an "over-revolution" condition, i.e., at rotational speeds beyond a specific rotational speed for which the engine is rated, it is typical to establish an upper critical speed for the automotive engine so as to prohibit an undesirable rise in rotational speed beyond the upper critical speed. Such an upper critical speed is referred to as an over-revolution restrictive speed in this specification. Prohibiting such an undesirable speed rise is performed by interrupting or cutting fuel supply to the engine, by controlling fuel ignition, or by controlling the rate at which intake air is admitted into the engine. An engine speed control system having an over-revolution prevention feature is known from, for instance, Japanese Unexamined Utility Model No. 59-194,550. On the other hand, because engine lubrication qualitatively deteriorates with a decrease in engine temperature, it has been proposed to lower the over-revolution restrictive speed, depending on a decrease in engine temperature, so as to realize reliable engine lubrication over allowable engine speeds.

Automotive engines require a certain speed control so that an over-revolution restrictive speed becomes lower for low engine temperatures. Such a speed control is hereafter referred to as an over-revolution prevention control, and is provided to protect the engine against deterioration of engine lubrication at low engine temperatures. Executing the over-revolution prevention control at low engine temperatures, however, may cause an automatic transmission to fail to up-shift in response to a requirement for quick acceleration. Moreover, an over-revolution prevention control system for an engine equipped with an automatic transmission may also have the disadvantage of letting the engine operate too sluggishly in speed for a long period of time to cause an up-shift, even if quick acceleration is needed. This is because the engine is normally forced to maintain a higher speed while operating at lower temperatures. This causes the shift-up vehicle speed to become higher, thereby heating up the engine. However, since the over-revolution restrictive speed established for lower engine temperatures remains low, although the shift-up vehicle speed is changed so that it becomes higher, no up-shift of the automatic transmission takes place, even though the engine operates at full throttle.

SUMMARY OF THE INVENTION

It is an object of the present invention to provide an engine control system which can compatibly manage two somewhat conflicting requirements governing over-revolution restrictive speed control, namely, the requirements for both engine protection and for shift-up vehicle speed control which provides adequate acceleration performance.

This object is accomplished by providing an engine speed control system for an engine, equipped with an automatic transmission, which shifts up according to predetermined shift schedules. By using the engine speed control of the present invention, the engine is prevented from being brought into over-revolution, and is protected. The engine speed control system includes an over-revolution prevention means, actuated at a predetermined engine speed. The predetermined engine speed is a speed critical to over-revolution and is referred to as an over-revolution restrictive speed. The over-revolution prevention means is actuated so as to decrease the engine output by, for instance, interruption of fuel supply to the engine, thereby preventing the engine from operating at speeds higher than the over-revolution restrictive speed. The over-revolution restrictive speed is altered, depending upon engine operating conditions such as engine temperatures. Simultaneously, in response to an alteration in the over-revolution restrictive speed, a regular shift-up vehicle speed, which is ideally determined by shift control lines to cause shift-up operations of the automatic transmission to occur according to throttle openings, is shifted according to engine temperatures.

Over-revolution restrictive speeds and shift-up vehicle speeds are decreasingly altered as the engine temperature becomes lower, at least while the engine operates under higher loads. Shifting or altering a regular shift-up vehicle speed is performed by shift coefficients which are predetermined according to several ranges of engine temperatures. Such shifting or altering may otherwise be performed by a throttle opening guard limit.

According to a specific embodiment of the present invention, when the over-revolution restrictive speed is reached while the engine operates under loads in which a throttle valve opens, an over-revolution prevention means causes an interruption of fuel supply to the engine, thereby suppressing an increase in engine speed.

When engine speed reaches the over-revolution restrictive speed while throttle valve is open, the over-revolution prevention means is actuated, so as to prevent over-revolution of the engine. The over-revolution speed is decreasingly altered according to engine operating conditions, such as decreases in engine temperature, so as to restrict speed up of the engine, thereby eliminating adverse effects on engine lubrication due to the decreases in engine temperature. With the decreasing change in over-revolution restrictive speed, a shift-up vehicle speed, at which a shift-up operation of the automatic transmission takes place, is decreased, at least while the engine operates under a high range of engine loads. This induces a quick shift-up operation of the automatic transmission when quick acceleration is needed while the engine temperature is still low.

BRIEF DESCRIPTION OF THE DRAWINGS

The above and other objects and features of the present invention will be apparent to those skilled in the art from the following description of preferred embodiments thereof when considered in conjunction with the drawings, in which.

DESCRIPTION OF THE PREFERRED EMBODIMENT

Because internal combustion engines and automatic transmissions are well known, the following description will be directed to particular elements forming part of, or cooperating directly with, an apparatus in accordance with the present invention. It is to be understood that elements not specifically shown or described can take various forms well known to those in the automotive art.

Figure 1:
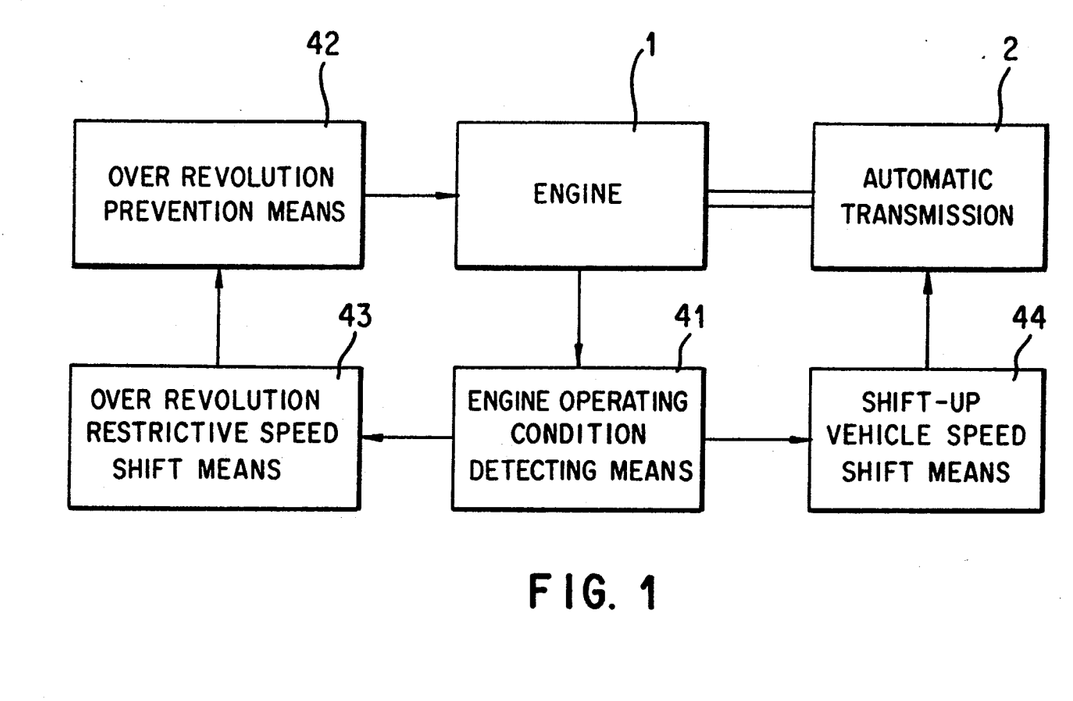
FIG. 1 is a block diagram showing a conceptual structure of an engine speed control system of the present invention.
Figure 2:
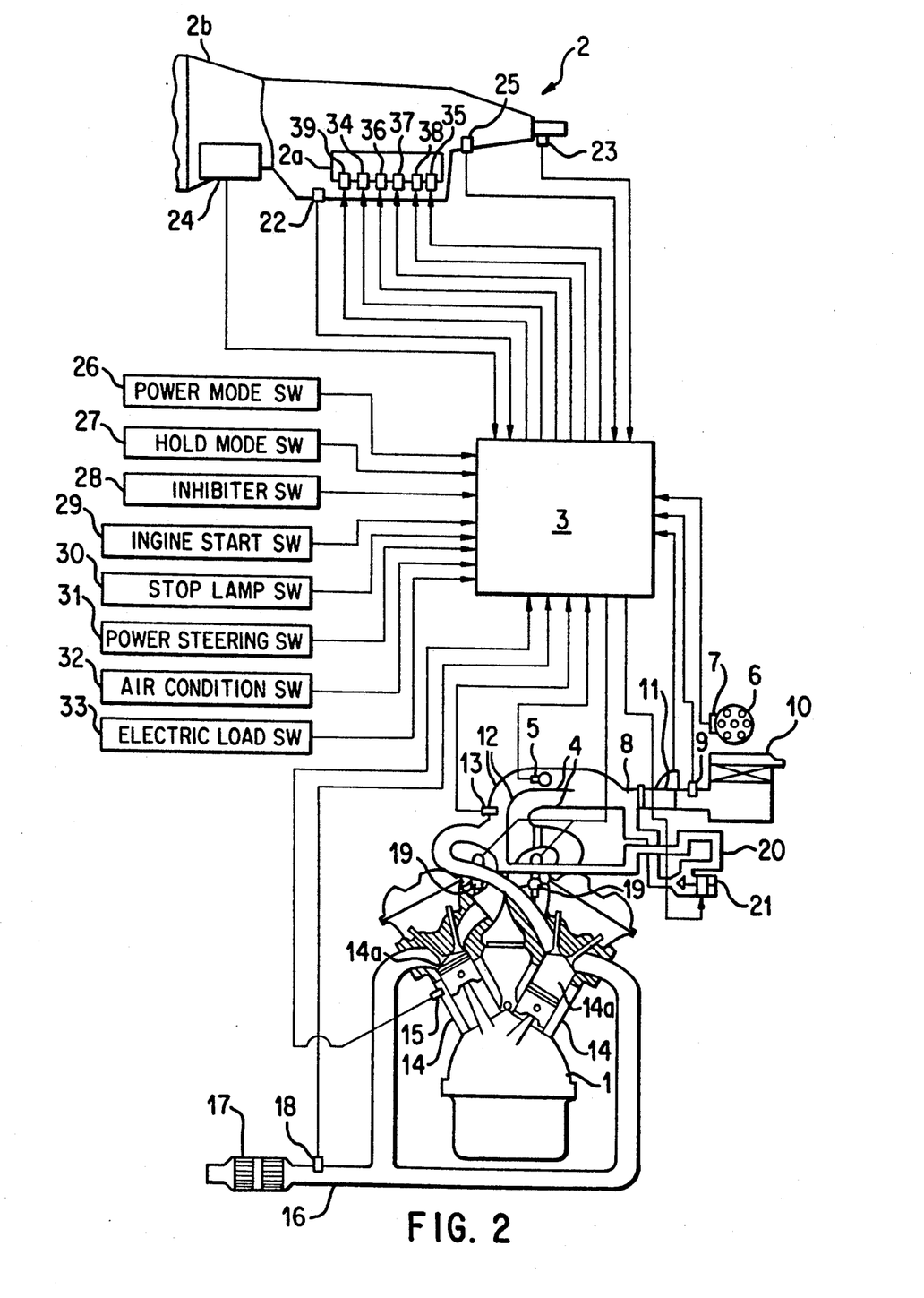
FIG. 2 is a schematic illustration showing an automobile engine equipped with an automatic transmission controlled by an engine speed control system in accordance with a preferred embodiment of the present invention.

Before describing a preferred embodiment of the present invention in detail, reference is made to FIG. 1 for the purpose of providing a conceptual description that will enhance an understanding of the operation of an engine speed control system for an engine equipped with an automatic transmission shown in FIG. 2. An engine speed control system, which controls an engine 1 coupled to an automatic transmission 2 so as to cooperate with the transmission, includes an engine operating condition detection means 41, an over-revolution prevention means 42, an over-revolution restrictive speed shift means 43, and a shift-up speed shift means 44. The over-revolution prevention means 42 is activated at an over-revolution restrictive speed so as to prevent an occurrence of over-revolution of the engine 1 while the engine 1 operates under loads. The over-revolution restrictive speed, which is predetermined for each predetermined range of engine operating conditions, is altered or shifted by the over-revolution restrictive speed shift means 43 suitably for an engine operating condition detected by the engine operating condition detection means 41. Accompanying the shift of over-revolution restrictive speed, the shift-up speed shift means 44 alters or shifts the shift-up vehicle speed.

The over-revolution prevention means 42 decreasingly alters its activation speed, namely, the over-revolution restrictive speed, by means of the over-revolution restrictive speed shift means 43, as engine temperature decreases. In the event of a decreasing alteration of over-revolution restrictive speed, the shift-up speed shift means 44 decreasingly alters the shift-up vehicle speed, depending upon the decrease in the over-revolution restrictive speed. Such a change in the shift-up vehicle speed is made at least or only while the engine operates in a high range of engine loads. Otherwise, the shift-up speed shift means 44 may increasingly alter the shift-up vehicle speed while the engine operates in middle and low engine load ranges.

In order to decreasingly alter the shift-up vehicle speed when the engine operates in the high range of engine loads and the over-revolution restrictive speed is decreasingly altered, means may be incorporated in the engine speed control system to restrictively use throttle openings for determining shift-up speeds according to a decrease in over-revolution restrictive speed during operation of the engine in the high range of engine loads.

Referring to FIG. 2, a V-type internal combustion engine 1 equipped with an automatic transmission 2, which is controlled by the engine speed control system in accordance with a preferred embodiment of the present invention, is shown. In order to detect engine operating conditions, there are provided various sensors and switches to provide electric signals to a control unit 3, formed mainly by a microcomputer.

Throttle opening sensor 5 is provided in an individual intake passage 12 for a row of cylinders of one of two cylinder banks to detect an opening of a throttle valve 4. In the same individual intake passage 12, there is provided a temperature sensor 13 downstream of the throttle valve 4. The temperature sensor 13 detects the temperature of intake air passed through the throttle valve 4. A crank angle sensor 7 is installed in a distributor 6 of an ignition system to detect a crank angle change rate as an engine rotational speed in a well known manner. A temperature sensor 9 is disposed in an integral intake passage 8 between the individual intake passages 12 and an air cleaner 10 to detect the temperature of intake air introduced through the air cleaner 10. In the integral intake passage 8, there is also provided an air flow sensor 11 downstream of the temperature sensor 9 to detect the flow rate of intake air introduced through the air cleaner 10. One of the cylinder banks 14 of the engine is provided with a temperature sensor 15 to detect the temperature of cooling water circulating in the engine 1. In an integral portion of exhaust passages 16, there is provided an oxygen sensor 18, which detects the oxygen content of exhaust gas so as help maintain a desired air-fuel mixture, thereby bringing the oxygen concentration back to proper level. The oxygen sensor 18 is disposed in front or upstream of a catalytic convertor 17 provided in the integral portion of exhaust passages 16. Based on the signals provided by the sensors mentioned above, the control unit 3 calculates a fuel injection pulse width. The amount of fuel delivered to each cylinder 14a by a given electronic fuel injector 19 depends on this fuel injection pulse width. An idle speed control (ISC) valve 21, controlled by the control unit 3, is provided in an intake bypass passage 20, branching off from the integral intake passage 8 and joining the individual intake passages 12. The idle speed control valve 21 allows intake air to bypass the throttle valve 4.

Automatic transmission 2 is provided with sensors, such as a vehicle speed sensor 22, a torque sensor 23, a turbine sensor 24, and an oil pressure sensor 25. The vehicle speed sensor 22 detects the speed of an output shaft (not shown) of the automatic transmission 2 as a vehicle speed. The torque sensor 23 detects the output torque of the automatic transmission 2. The turbine sensor 24, which is specifically incorporated in a torque convertor 2b, detects the turbine speed of the torque convertor. The oil pressure sensor 25 detects oil pressure applied to a valve body 2a for controlling various solenoids. These solenoids, namely, a lock up solenoid 34, a lock up release solenoid 35, shift solenoids 36, 37 and 38, and a line pressure solenoid 39, are selectively activated and deactivated based on signals provided by switches 26 to 33 by the control unit 3 so as to shift the automatic transmission 2.

Power mode switch 26, installed in, for instance, an instrument panel, provides a signal representative of a power-drive pattern. A hold mode switch 27, incorporated in a shift lever (not shown) of the automatic transmission 2, provides a signal representative of holding a selected drive pattern. An inhibiter switch 28, incorporated in the shift lever (not shown) of the automatic transmission 2, provides a signal representative of a shift lever position. An engine start switch 29 detects an engine ignition. Switches 30-33 are a stop lamp switch for detecting operation of a brake pedal, a power steering switch for detecting operation of a power steering system, an air conditioning switch for detecting whether or not an air conditioning system is operating, and an electric load switch for detecting whether or not various electric devices, such as electric lamps, are operating, respectively. All of these switches 30-33 provide signals, respectively, to the control unit 3.

Control unit 3 provides a fuel interruption signal to the electronic fuel injector 19 so as to interrupt fuel supply of the electronic fuel injector 19 during deceleration induced while the engine operates at a speed higher than a predetermined speed and the throttle valve is fully closed. This condition is hereafter referred to as deceleration fuel interruption. Control unit 3 also provides a fuel interruption signal to the electronic fuel injector 19 so as to interrupt fuel supply of the electronic fuel injector 19 and prevent over-revolution of the engine 1 when the engine 1 reaches a predetermined engine speed of, for instance, approximately 7,000 rpm under engine loads, except when the throttle valve 4 is fully closed. This condition is hereafter referred to anti-over-revolution fuel interruption.

Figure 3A:
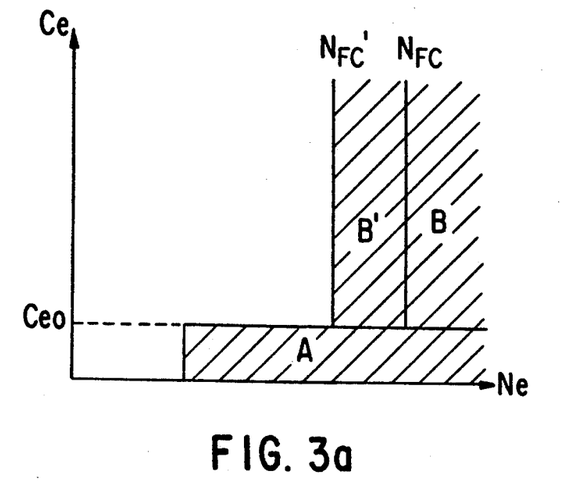
FIG. 3(a) is a diagram showing zones of fuel interruption in terms of engine load and engine speed.

In the diagram represented in FIG. 3(a), the abscissa and the ordinate, respectively, indicate engine speed Ne and engine load Ce, which is represented by the quotient of the amount of intake air Qa divided by engine speed Ne. In FIG. 3(a), reference characters A and B, respectively, designate a deceleration fuel interruption zone, which is defined below a specific engine load Ceo representative of a condition which the throttle valve 4 is fully closed, and an anti-over-revolution fuel interruption zone, which is defined above both the specific engine load Ceo and a specific engine speed $N_{FC}$. The specific engine speed $N_{FC}$ is a critical engine speed, namely, an over-revolution restrictive speed, for protecting the engine from over-revolution. The over-revolution restrictive speed $N_{FC}$ is changed to another lower over-revolution restrictive speed $N_{FC}'$ according to a water temperature representing an engine temperature during warming up of the engine 1. This change expands the anti-over-revolution fuel interruption zone B for normal temperatures to an anti-over-revolution fuel interruption zone B' for low engine temperatures.

Figure 3B:
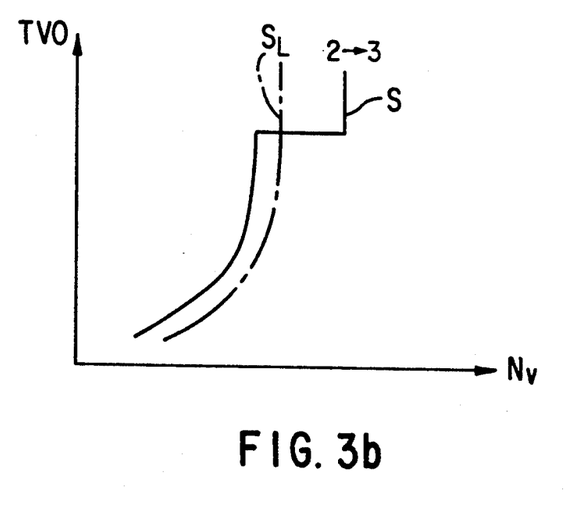
FIG. 3(b) is a diagram showing, as an example, a 2-3 shift-up speed control line and its shifted control line.

In the diagram represented in FIG. 3(b) predesigned 2-3 (second gear to third gear) shift-up schedules or shift-up control lines, defined in terms of vehicle speeds Nv and throttle valve openings TVO are shown. This diagram shows a 2-3 shift-up control line S, which is established for engine speeds in the anti-over-revolution fuel interruption zone B. Data representing the 2-3 shift-up control line S is carried in a transmission shift control map. The shift-up control line S is modified to a low temperature 2-3 shift-up control line $S_L$ in response to expansion of the anti-over-revolution fuel interruption zone from the zone B to the zone B'. Specifically, the 2-3 shift-up control line S is shifted toward a lower vehicle speed side in a range of higher engine loads and toward a higher vehicle speed side in ranges of low and middle engine loads.

Figure 4:
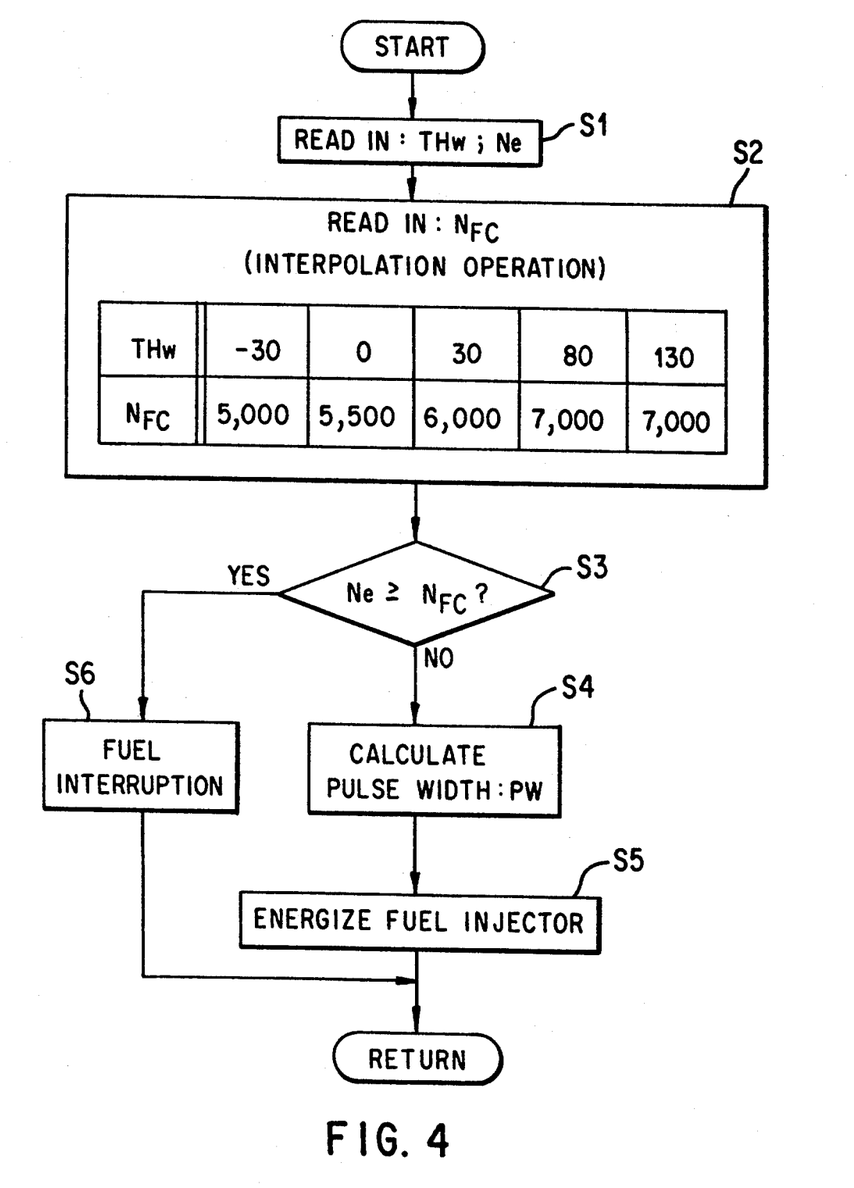
FIG. 4 is a flow chart illustrating a fuel interruption control routine for a microcomputer of a control unit shown in FIG. 2 for preventing over-revolution of the engine.
Figure 5:
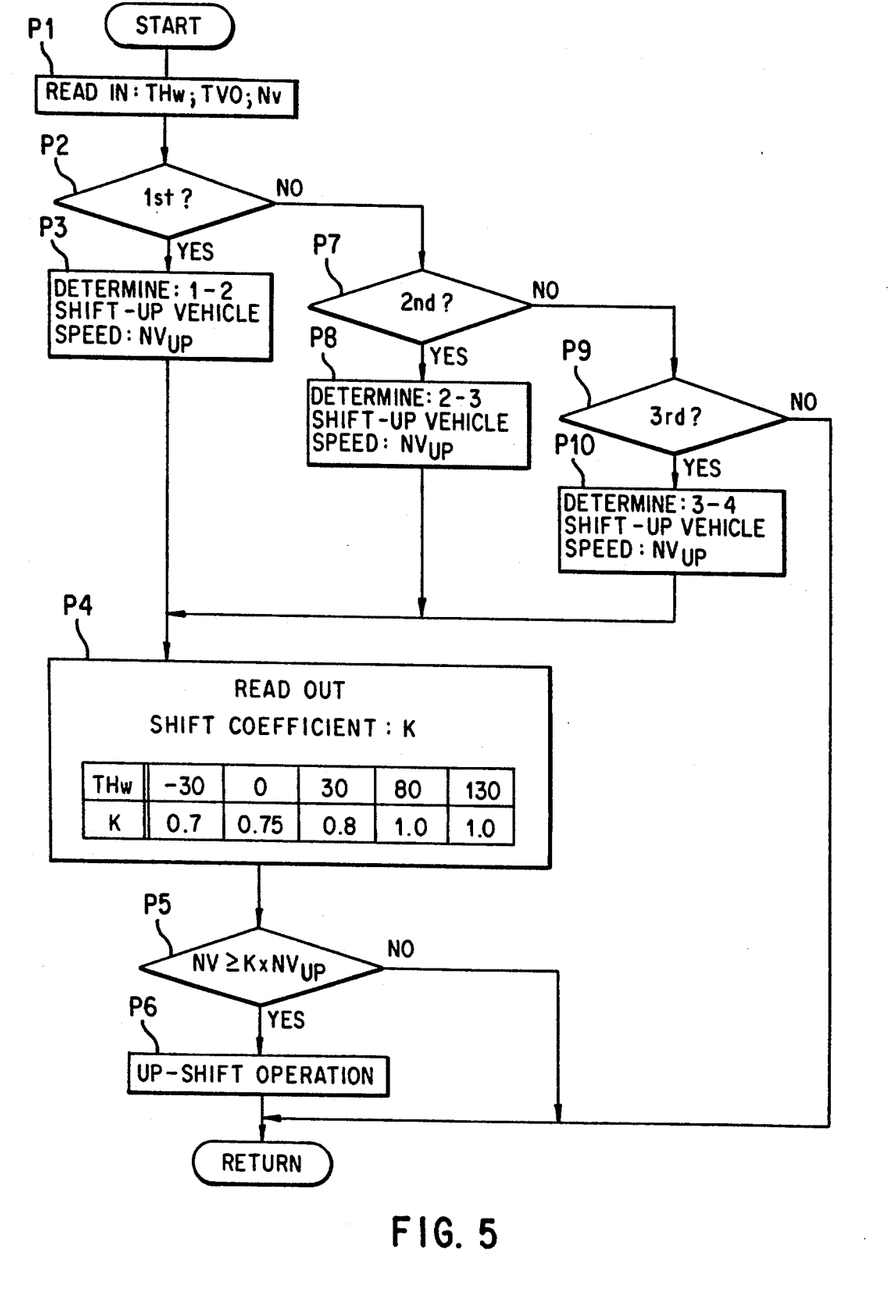
FIG. 5 is a flow chart illustrating a shift-up speed control line shift control routine for the automatic transmission.
Figure 6:
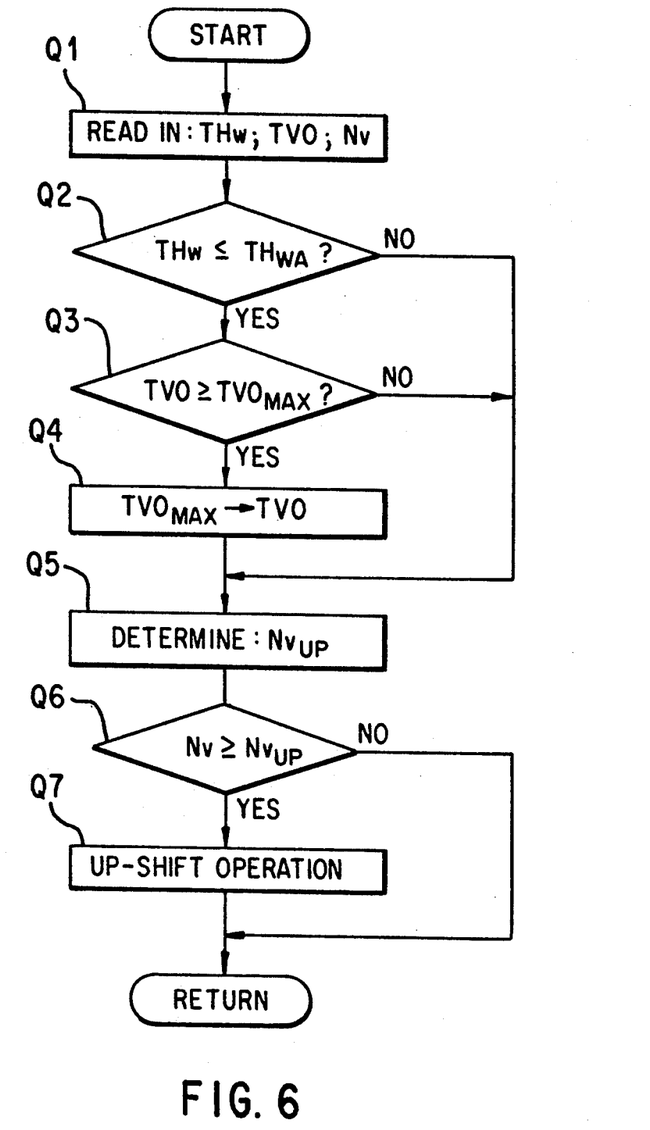
FIG. 6 is a flow chart illustrating a control routine limiting the shift-up speed of the automatic transmission.

The operation of the engine speed control system depicted in FIG. 2 will be best understood by reviewing FIGS. 4 to 6, which are flow charts illustrating various control routines for the microcomputer of the control unit 3. Programming a computer is a skill well understood in the art. The following description is written to enable a programmer having ordinary skill in the art to prepare an appropriate program for the microcomputer. The particular details of any such program would, of course, depend upon the architecture of the particular computer selected.

Referring to FIG. 4, which is a flow chart of an anti-over-revolution fuel interruption control routine, the first step at step S1 is to read in an engine coolant water temperature THw, detected by the water temperature sensor 15, and an engine speed Ne, detected by crank angle sensor 7. At step S2, a desirable over-revolution restrictive speed $N_{FC}$ is calculated, based on the engine coolant water temperature THw, from a data table of over-revolution restrictive speeds $N_{FC}$, which is stored in a memory of the microcomputer of the control unit 3. Over-revolution restrictive speeds $N_{FC}$ are predetermined stepwise for a number of temperatures, such as −30, 0 (zero), 30, 80 and 130 degrees centigrade. For temperatures between adjacent temperature valves, over-revolution restrictive speeds $N_{FC}$ are calculated by an interpolation calculation. Thereafter, a decision is made at step S3 as to whether or not the engine speed Ne has reached the over-revolution restrictive speed $N_{FC}$. If the answer to the decision made at step S3 is "NO," indicating that the engine speed Ne is lower than the over-revolution restrictive speed $N_{FC}$ and, accordingly, that there is no necessity for any interruption of fuel supply, then, a pulse width PW, at which the electronic fuel injector 19 is pulsed or energized, is calculated in an ordinary manner at step S4, based at least partly on the intake air intake rate. The electronic fuel injector 19 is actually pulsed or energized at the pulse width PW at step S5 so as to inject a desired amount of fuel.

On the other hand, if the answer to the decision made at step S3 is "YES," this indicates that the engine speed Ne has reached the over-revolution restrictive speed $N_{FC}$ and, accordingly, that there is a strong demand for fuel interruption, then, a fuel interruption control is performed in a well known manner at step S6 so as to prevent over-revolution of the engine 1.

Referring to FIG. 5, which is a flow chart illustrating a shift-up control line shift control routine, after reading in an engine coolant water temperature THw, a vehicle speed Nv and a throttle valve opening TVO at step P1, a decision is made at step P2 as to whether or not the automatic transmission 2 is in first gear. If the answer to the decision is "YES," that is, if the automatic transmission 2 is actually in first gear, then, at step P3, a 1-2 shift-up vehicle speed $Nv_{UP}$ is determined from a 1-2 shift-up control line defined in terms of throttle valve opening TVO and water temperature THw.

After having determined the 1-2 shift-up vehicle speed $Nv_{UP}$, a shift coefficient K is read out for the water temperature THw. Shift coefficients K are predetermined stepwise for several temperatures, such as −30, 0 (zero), 30, 80 and 130 degrees centigrade. Each shift coefficient K is assigned to all temperatures equal to and lower than its corresponding temperature. It is to be noted that multiplying all shift-up vehicle speeds $Nv_{UP}$ by a shift coefficient K shifts a shift-up control line S to a low temperature shift-up control line $S_L$ as shown in FIG. 3(b).

At step P5, a decision is made as to whether or not the vehicle speed Nv is equal to or greater than a low temperature 1-2 shift-up vehicle speed $K \times Nv_{UP}$. If the answer is "YES," this indicates that the vehicle has sped up sufficiently to shift up the automatic transmission 2 from first gear to second gear. Then, a first to second up-shift operation of the automatic transmission 2 is performed at step P6. If the answer to the decision made in step P5 is "NO," the routine orders return without performing any up-shift operation.

If the answer to the decision made concerning the first gear at step P2 is "NO." a decision is made at step P7 as to whether or not the automatic transmission 2 is in the second gear. If the answer to the decision is "YES," that is, if the automatic transmission 2 is actually in second gear, then, at step P8, a 2-3 shift-up vehicle speed $Nv_{UP}$ is determined from a 2-3 shift-up control line defined in terms of throttle valve opening TVO and water temperature THw. Thereafter, the same procedures take place at steps P5 and P6. That is, at step P5, a decision is made as to whether or not the vehicle speed Nv is equal to or greater than a low temperature 2-3 shift-up vehicle speed $K = Nv_{UP}$. If the answer is "YES," this indicates that the vehicle has sped up sufficiently to shift the automatic transmission 2 from the second gear to a third gear, and then, a second to third up-shift operation of the automatic transmission 2 is performed at step P6.

If the answer to the decision made concerning the second gear at step P7 is "NO, " a decision is then made at step P9 as to whether or not the automatic transmission 2 is in the third gear. If the answer to the decision made at step P9 is "YES," that is, if the automatic transmission 2 is actually in the third gear, then, at step P10, a 3-4 shift-up vehicle speed $Nv_{UP}$ is determined from a 3-4 shift-up control line defined in terms of throttle valve opening TVO and water temperature THw. Thereafter, the same procedures take place at steps P5 and P6. That is, at step P5, a decision is made as to whether or not the vehicle speed Nv is equal to or greater than a 3-4 shift-up vehicle speed $K \times Nv_{UP}$. If the answer is "YES," this indicates that the vehicle has sped up sufficiently to shift the automatic transmission 2 up from the third gear. Then, a third to fourth up-shift operation of the automatic transmission 2 is performed at step P6. If the answer to the decision made at step P9 is "NO," the routine orders return without performing any up-shift operation.

The shift-up control line shift control routine shown in FIG. 5 may be replaced by a shift-up control line shift routine represented by a flow chart shown in FIG. 6.

Referring to FIG. 6, after reading in a water temperature THw, a throttle valve opening TVO, and a vehicle speed Nv, a decision is made at step Q2 as to whether or not the water temperature THw is equal to or lower than a predetermined critical temperature $TH_{WA}$. If the answer to the decision made at step Q2 is "YES, " this indicates that a shift-up control line should be shifted. Then, another decision is made at step Q3 as to whether or not the throttle valve opening TVO is equal to or greater than a predetermined maximum opening $TVO_{MAX}$, which functions as a guard opening. If the throttle valve opening TVO is equal to or greater than the maximum value $TVO_{MAX}$, the throttle valve opening TVO is replaced with the maximum opening $TVO_{MAX}$ at step Q4. Thereafter, a shift-up control line S is retrieved from the transmission shift control map in accordance with the maximum opening $TVO_{MAX}$, and a desired shift-up vehicle speed $Nv_{UP}$ is determined at step Q5. However, if the answer to the decision made in step Q2 concerning the water temperature THw is "NO," or if the answer to the decision made in step Q3 concerning the throttle valve opening TVO is "NO", even though the answer to the decision concerning the water temperature THw is "YES," then, a shift-up control line S is retrieved from the transmission shift control map in accordance with the throttle valve opening TVO and a desired shift-up vehicle speed $Nv_{UP}$ at step Q5.

Based on the retrieved shift-up control line S, a decision is made at step Q6 as to whether or not the vehicle speed Nv is equal to or greater than the shift-up vehicle speed $Nv_{UP}$. If the answer to the decision made at step Q6 is "YES," this indicates that the vehicle has sped up sufficiently to shift up the automatic transmission 2. Then, an up-shift operation of the automatic transmission 2 is performed at step Q7. The final step orders a return to the main program. However, if the answer to the decision at step Q6 is "No," then, the routine orders return without performing any up-shift operation.

According to the shift-up control line shift routine, when the engine coolant water temperature TRw is low, the engine speed control system limits the throttle valve opening read out from the transmission shift control map to the maximum or guard opening $TVO_{MAX}$. Consequently, the shift-up vehicle speeds $Nv_{UP}$ are substantially lowered, since on the shift-up control lines, the shift-up vehicle speeds $Nv_{UP}$ get higher as the throttle valve opening TVO becomes larger.

According to the present invention, prevention of over-revolution of the engine is achieved by controlling ignition timing and by controlling the rate at which intake air is admitted into a combustion chamber, as well as by interrupting fuel supply.

It is to be understood that although the present invention has been described in detail with respect to preferred embodiments thereof, various other embodiments and variants may occur to those skilled in the art. Any such other embodiments and variants which fall within the scope and spirit of invention are intended to be covered by the following claims.

What is claimed is:

1. An engine speed control system for an automobile engine equipped with an automatic transmission, said engine speed control system comprising:

over-revolution prevention means, actuated at a predetermined engine speed so as to decrease engine output, for preventing said engine from being brought into over-revolution while said engine operates under loads;

engine operating condition detecting means for detecting an engine operating condition, including at least a throttle opening of an engine throttle valve;

speed altering means for altering said predetermined engine speed depending upon said engine operating condition detected by said engine operating condition detecting means; and shift-up vehicle speed shift means for determining a regular shift-up vehicle speed, at which said automatic transmission is shifted up, according to a throttle opening of said engine throttle valve detected by said engine operating condition detecting means, and shifting said regular shift-up vehicle speed in response to an alteration of said predetermined engine speed.

2. An engine speed control system as recited in claim 1, wherein said over-revolution prevention means comprises means for causing an interruption of fuel supply to said engine.

3. An engine speed control system as recited in claim 2, wherein said engine operating condition detecting means also detects an engine temperature, said speed altering means decreasing said predetermined engine speed as an engine temperature detected by said engine operating condition detecting means becomes lower.

4. An engine speed control system as recited in claim 3, wherein said shift-up vehicle speed shift means shifts said regular shift-up vehicle speed by shift coefficients according to engine temperatures detected by said engine operating condition detecting means.

5. An engine speed control system as recited in claim 4, wherein said shift-up vehicle speed shift means decreases said regular shift-up vehicle speed in response to a decrease in said predetermined engine speed.

6. An engine speed control system as recited in claim 5, wherein said shift-up vehicle speed shift means decreases said regular shift-up vehicle speed in response to a decrease in said predetermined engine speed only while said engine operates at certain engine loads.

7. An engine speed control system as recited in claim 6, wherein said shift-up vehicle speed shift means increases said regular shift-up vehicle speed in response to an increase in said predetermined engine speed while said engine operates at other engine loads.

8. An engine speed control system as recited in claim 3, wherein said shift-up vehicle speed shift means includes means for limiting a throttle opening of said engine throttle valve detected by said engine operating condition detecting means to a predetermined guard opening.

9. An engine speed control system as recited in claim 8, wherein said shift-up vehicle speed shift means decreases said regular shift-up vehicle speed in response to a decrease in said predetermined engine speed.

10. An engine speed control system as recited in claim 9, wherein said shift-up vehicle speed shift means decreases said regular shift-up vehicle speed in response to a decrease in said predetermined engine speed only while said engine operates at certain engine loads.

11. An engine speed control system as recited in claim 10, wherein said shift-up vehicle speed shift means decreases said regular shift-up vehicle speed in response to an increase in said predetermined engine speed while said engine operates at other engine loads.

12. An engine speed control system for an automobile engine equipped with an automatic transmission which shifts up at predetermined shift-up vehicle speeds according at least to throttle openings, said engine speed control system comprising:
over-revolution prevention means, actuated at a predetermined engine speed so as to decrease engine output, for preventing said engine from being brought into over-revolution while said engine operates under loads;
engine temperature detecting means for detecting an engine operating temperature of said engine;
speed altering means for decreasing said predetermined engine speed with a decrease in engine temperature detected by said engine temperature detecting means; and
shift-up vehicle speed shift means for decreasing a predetermined shift-up vehicle speed in response to a decrease of said predetermined engine speed.

13. An engine speed control system as recited in claim 12, wherein said shift-up vehicle speed shift means decreases said predetermined shift-up vehicle speed in response to a decrease of said predetermined engine speed only while said engine operates at certain engine loads.

14. An engine speed control system as recited in claim 13, wherein said shift-up vehicle speed shift means increases said predetermined shift-up vehicle speed in response to a decrease of said predetermined engine speed while said engine operates at other engine loads.

15. An engine speed control system for an automobile engine equipped with an automatic transmission which shifts up at predetermined shift-up vehicle speeds according at least to throttle openings, said engine speed control system comprising;
over-revolution prevention means, actuated at a predetermined engine speed so as to decrease engine output, for preventing said engine from being brought into over-revolution while said engine operates under loads;
engine temperature detecting means for detecting an engine operating temperature of said engine;
speed altering means for decreasing said predetermined engine speed with a decrease in engine temperature detected by said engine temperature detecting means;
throttle valve opening detecting means for detecting a throttle opening of an engine throttle valve; and
shift-up vehicle speed shift means for limiting the throttle opening of said engine throttle valve to a predetermined guard opening according to which a predetermined shift-up vehicle speed is restrictively determined when said engine temperature detecting means detects a predetermined engine temperature.

16. An engine speed control system for an automobile engine equipped with an automatic transmission, said engine speed control system comprising:
over-revolution prevention means, actuated at a predetermined engine speed so as to decrease engine output, for preventing said engine from being brought into over-revolution while said engine operates under loads;
engine operating condition detecting means for detecting an engine operating condition, including at least an engine load on said engine;
speed altering means for altering said predetermined engine speed depending upon said engine operating condition detected by said engine operating condition detecting means; and
shift-up vehicle speed shift means for determining a regular shift-up vehicle speed, at which said automatic transmission is shifted up, according to the engine load detected by said engine operating condition detecting means, and shifting said regular shift-up vehicle speed in response to an alteration of said predetermined engine speed.

* * * * *